(12) United States Patent
Inoue et al.

(10) Patent No.: US 10,014,708 B2
(45) Date of Patent: Jul. 3, 2018

(54) ELECTRIC POWER SUPPLY APPARATUS, ELECTRIC POWER RECEIVING APPARATUS, METHOD OF CONTROLLING ELECTRIC POWER SUPPLY APPARATUS, AND METHOD OF CONTROLLING ELECTRIC POWER RECEIVING APPARATUS

(71) Applicant: CANON KABUSHIKI KAISHA, Tokyo (JP)

(72) Inventors: Hiroshi Inoue, Kawasaki (JP); Tomoaki Hokyo, Kawasaki (JP); Kazuhide Nagamine, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 14/412,997

(22) PCT Filed: Jun. 26, 2013

(86) PCT No.: PCT/JP2013/004005
§ 371 (c)(1),
(2) Date: Jan. 5, 2015

(87) PCT Pub. No.: WO2014/006852
PCT Pub. Date: Jan. 9, 2014

(65) Prior Publication Data
US 2015/0162778 A1    Jun. 11, 2015

(30) Foreign Application Priority Data
Jul. 6, 2012    (JP) .................................. 2012-152390

(51) Int. Cl.
*H01F 27/42* (2006.01)
*H01F 37/00* (2006.01)
(Continued)

(52) U.S. Cl.
CPC ............. *H02J 7/025* (2013.01); *H02J 7/0004* (2013.01); *H02J 17/00* (2013.01); *H02J 50/12* (2016.02);
(Continued)

(58) Field of Classification Search
CPC .......... H02J 7/0004; H02J 17/00; H02J 7/025; Y10T 307/414
See application file for complete search history.

(56) References Cited

U.S. PATENT DOCUMENTS 9,059,599 B2 * 6/2015 Won ........................ H02J 7/025
2006/0238365 A1 * 10/2006 Vecchione ............. G04C 10/00
340/657

(Continued)

FOREIGN PATENT DOCUMENTS

JP    2007-089341 A    4/2007
JP    2009-268311 A    11/2009
(Continued)

OTHER PUBLICATIONS

International Search Report and Written Opinion for PCT/JP2013/004005, dated Sep. 17, 2013.

*Primary Examiner* — Jared Fureman
*Assistant Examiner* — Esayas Yeshaw
(74) *Attorney, Agent, or Firm* — Canon USA, Inc. I.P. Division (57) ABSTRACT

The present invention provides a technique to control a distribution of electric power depending on electric power consumption of each of a plurality of electric power receiving apparatuses. An electric power supply apparatus includes an acquisition unit configured to acquire information associated with electric power consumption of each of the plurality of electric power receiving apparatuses, a determination unit configured to determine the distribution (Continued)

of electric power to the plurality of electric power receiving apparatuses based on the information acquired by the acquisition unit such that a greater amount of distribution of electric power is assigned to an electric power receiving apparatus having greater electric power consumption, and an electric power supply unit configured to supply electric power to each of the plurality of electric power receiving apparatuses according to the distribution of electric power determined by the determination unit.

15 Claims, 9 Drawing Sheets

(51) Int. Cl.
| | |
|---|---|
| *H01F 38/00* | (2006.01) |
| *H02J 7/02* | (2016.01) |
| *H02J 50/40* | (2016.01) |
| *H02J 50/80* | (2016.01) |
| *H02J 50/12* | (2016.01) |
| *H02J 7/00* | (2006.01) |
| *H02J 17/00* | (2006.01) |

(52) U.S. Cl.
CPC .............. *H02J 50/40* (2016.02); *H02J 50/80* (2016.02); *H02J 7/02* (2013.01); *Y10T 307/414* (2015.04)

(56) References Cited

U.S. PATENT DOCUMENTS

| | | | |
|---|---|---|---|
| 2007/0060185 A1* | 3/2007 | Simon | H04W 52/08 455/522 |
| 2009/0133942 A1* | 5/2009 | Iisaka | H02J 7/025 178/43 |
| 2009/0284369 A1* | 11/2009 | Toncich | G06K 7/0008 340/539.3 |
| 2013/0241474 A1* | 9/2013 | Moshfeghi | H02J 7/0027 320/108 |
| 2014/0292090 A1* | 10/2014 | Cordeiro | H02J 17/00 307/104 |

FOREIGN PATENT DOCUMENTS

| | | |
|---|---|---|
| JP | 2010-268610 A | 11/2010 |
| JP | 2011-193707 A | 9/2011 |

\* cited by examiner

| NUMBER OF APPARATUSES TO WHICH POWER IS TO BE SUPPLIED | DETECTED POWER RECEIVING APPARATUS | POWER CONSUMPTION | POWER SUPPLY TIME |
|---|---|---|---|
| THREE APPARATUSES | 102 | 0.2 W | 20 ms |
|  | 103 | 0.3 W | 30 ms |
|  | 104 | 0.5 W | 50 ms |

FIG. 8A

| MODE | POWER CONSUMPTION |
|---|---|
| ACTIVE MODE | LARGE |
| IDLE MODE | MIDDLE |
| SLEEP MODE | SMALL |

FIG. 8B

| APPARATUS TYPE | POWER CONSUMPTION |
|---|---|
| PC | LARGE |
| PORTABLE TELEPHONE | MIDDLE |
| CAMERA | SMALL |

ELECTRIC POWER SUPPLY APPARATUS, ELECTRIC POWER RECEIVING APPARATUS, METHOD OF CONTROLLING ELECTRIC POWER SUPPLY APPARATUS, AND METHOD OF CONTROLLING ELECTRIC POWER RECEIVING APPARATUS

TECHNICAL FIELD

The present invention relates to a method of supplying electric power to a plurality of electric power receiving apparatuses.

BACKGROUND ART

It is known to wirelessly supply electric power to an electric power receiving apparatus from an electric power supply apparatus. Hereinafter, this technique will be referred to as a wireless electric power supply technique. PTL 1 discloses a technique in which one electric power supply apparatus wirelessly supplies electric power to a plurality of electric power receiving apparatuses in a time sharing manner.

CITATION LIST

Patent Literature

PTL 1: U.S. Patent Application Publication No. 2009/0284369

SUMMARY OF INVENTION

Technical Problem

In conventional techniques of wirelessly supplying electric power to a plurality of electric power receiving apparatuses, nothing is considered about electric power consumption of each of the plurality of electric power receiving apparatuses. This may cause it to supply an equal amount of electric power to communication apparatuses or the like regardless of whether the communication apparatus is in a communication process or in a waiting state, which may cause a communication apparatus being in a communication process not to obtain electric power needed to continue the communication process. This may cause the communication apparatus being in the communication process to stop the communication process.

The present invention provides a technique to control a distribution of electric power to a plurality of electric power receiving apparatuses depending on electric power consumption of each of the plurality of electric power receiving apparatuses.

Solution to Problem

In an embodiment, the present invention provides an electric power supply apparatus including an acquisition unit configured to acquire information associated with electric power consumption of each of a plurality of electric power receiving apparatuses, a determination unit configured to determine a distribution of electric power to the plurality of electric power receiving apparatuses based on the information acquired by the acquisition unit such that a greater amount of distribution of electric power is assigned to an electric power receiving apparatus having greater electric power consumption, and an electric power supply unit configured to supply electric power to each of the plurality of electric power receiving apparatuses according to the distribution of electric power determined by the determination unit.

Further features of the present invention will become apparent from the following description of exemplary embodiments with reference to the attached drawings.

DESCRIPTION OF EMBODIMENTS

Figure 1:
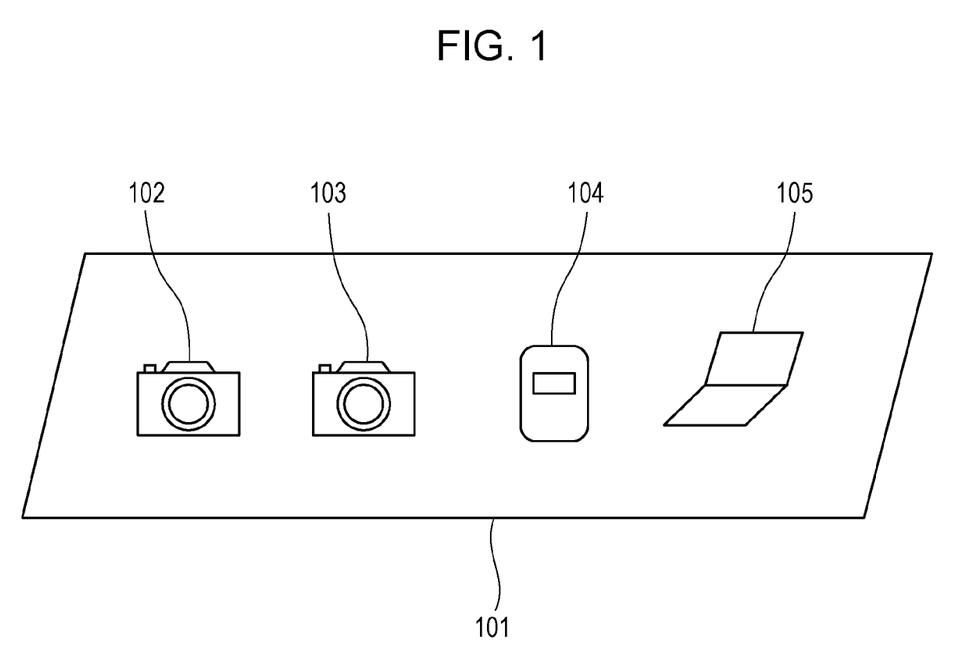
FIG. 1 is a diagram illustrating a network configuration.

FIG. 1 illustrates a system configuration according to an embodiment. An electric power supply apparatus 101 is configured to wirelessly supply electric power to electric power receiving apparatuses 102 to 105. In the present embodiment, it is assumed by way of example that an electric power supply apparatus is an electric power supply stand (or an electric power supply mat or the like), and an electric power receiving apparatus is a camera, a portable telephone (such as that so called a smartphone), personal computer (PC), or the like. Note that the electric power supply apparatus and the electric power receiving apparatus are not limited to those examples.

Figure 2A:
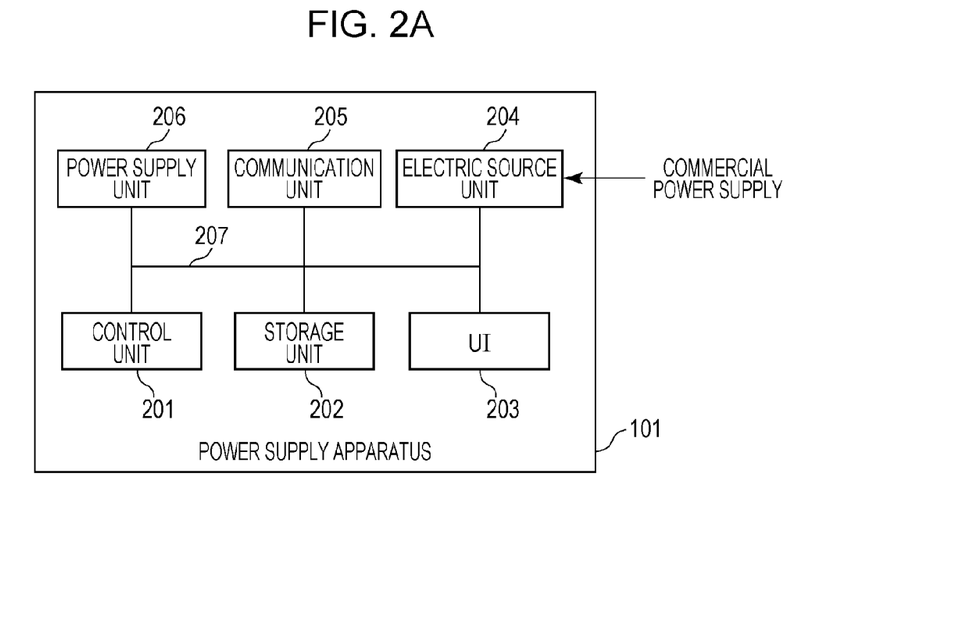
FIG. 2A is a diagram illustrating a hardware configuration of an electric power supply apparatus.

FIG. 2A illustrates an example of a hardware configuration of the electric power supply apparatus 101.

A control unit 201 includes a CPU or an MPU, and is configured to control the electric power supply apparatus 101 by executing a program stored in a storage unit 202. The storage unit 202 includes a ROM and a RAM and is configured to store programs for use in performing various operations described below and store various kinds of information including information indicating electric power consumption of each of the electric power receiving apparatuses 102 to 105. Note that the control unit 201 executes the programs stored in the storage unit 202. Instead of configuring the storage unit 202 using a memory such as a ROM or a RAM, the storage unit 202 may be realized using a storage medium such as a flexible disk, a hard disk, an optical disk, a magneto-optical disk, a CD-ROM, a CD-R, a magnetic tape, a nonvolatile memory card, a DVD, or the like. A user interface unit (hereinafter referred to simply as a UI) 203 displays various kinds of information and accepts various operations performed by a user.

An electric source unit 204 acquire electric power from a commercial electric power supply and supplies electric power to various hardware units in the electric power supply apparatus 101. The electric source unit 204 supplies electric power to the electric power receiving apparatuses 102 to 105 via an electric power supply unit 206 described later. The electric source unit 204 may be a battery. A communication unit 205 wirelessly communicates with the electric power receiving apparatuses 102 to 105 to acquire information about the electric power receiving apparatuses 102 to 105 for use in controlling supplying electric power. More specifically, in the present embodiment, a Near Filed Communication (NFC) technique is used by the communication unit 205 in wireless communication. The communication unit 205 may use other communication techniques such as a wireless communication technique based on the IEEE802.11 series standards, or Bluetooth, IrDA (infrared communication), TransferJet (trademark), UWB, or the like.

The electric power supply unit 206 wirelessly supplies electric power (that is, performs a wireless electric power supply) from the electric source unit 204 to the electric power receiving apparatuses 102 to 105. In the present embodiment, it is assumed by way of example that the electric power supply unit 206 performs the wireless electric power supply using a magnetic resonance method. Note that other methods such as an electromagnetic induction method may be employed to wirelessly supply electric power. In a case where the electric power supply unit 206 supplies electric power to a plurality of electric power receiving apparatuses, electric power is supplied using a time sharing technique. Note that electric power may be supplied not wirelessly but via a wire. A bus 207 connects various hardware units in the electric power supply apparatus 101.

Figure 2B:
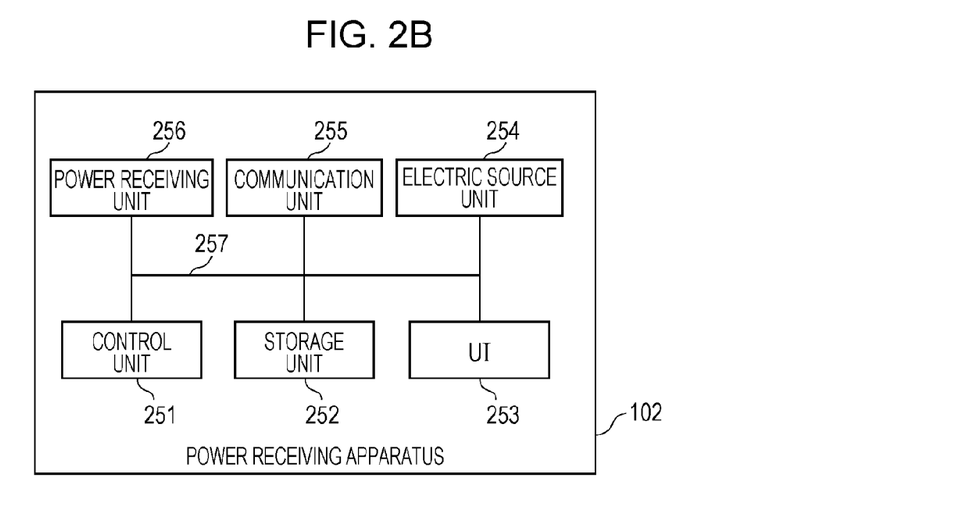
FIG. 2B is a diagram illustrating a hardware configuration of an electric power receiving apparatus.

FIG. 2B illustrates an example of a hardware configuration of the electric power receiving apparatus 102. Note that the electric power receiving apparatuses 103 to 105 may be similar in hardware configuration to the electric power receiving apparatus 102.

A control unit 251 includes a CPU a MPU, or the like, and is configured to control the electric power receiving apparatus 102 by executing a program stored in a storage unit 252. The storage unit 252 includes a ROM and a RAM and store various kinds of information including a program executed by the control unit 251. Various operations described below are performed by the control unit 251 by executing the program stored in the storage unit 252. Instead of configuring the storage unit 252 using a memory such as a ROM or a RAM, the storage unit 252 may be realized using a storage medium such as a flexible disk, a hard disk, an optical disk, a magneto-optical disk, a CD-ROM, a CD-R, a magnetic tape, a nonvolatile memory card, a DVD, or the like. A user interface unit (UI) 253 displays various kinds of information and accepts various operations performed by a user.

An electric source unit 254 is a battery configured to store electric power received from an electric power receiving unit 256 described below. The electric source unit 254 may be configured so as to be removable from the electric power receiving apparatus 102. The electric source unit 254 supplies electric power to various hardware units in the electric power receiving apparatus 102. A communication unit 255 wirelessly communicates with the electric power supply apparatus 101. In the present embodiment, a Near Filed Communication (NFC) technique is used by the communication unit 255 in wireless communication. The wireless communication may be performed using other communication techniques such as a wireless communication technique based on the IEEE802.11 series standards, or Bluetooth, IrDA (infrared communication), TransferJet (trademark), UWB, or the like.

The electric power receiving unit 256 wirelessly receive electric power from the electric power supply apparatus 101. In the present embodiment, it is assumed by way of example that the electric power receiving unit 256 receives electric power using magnetic resonance, but other methods such as electromagnetic induction may be employed to receive electric power. A bus 257 connects various hardware units in the electric power receiving apparatus 102.

Figure 3A:
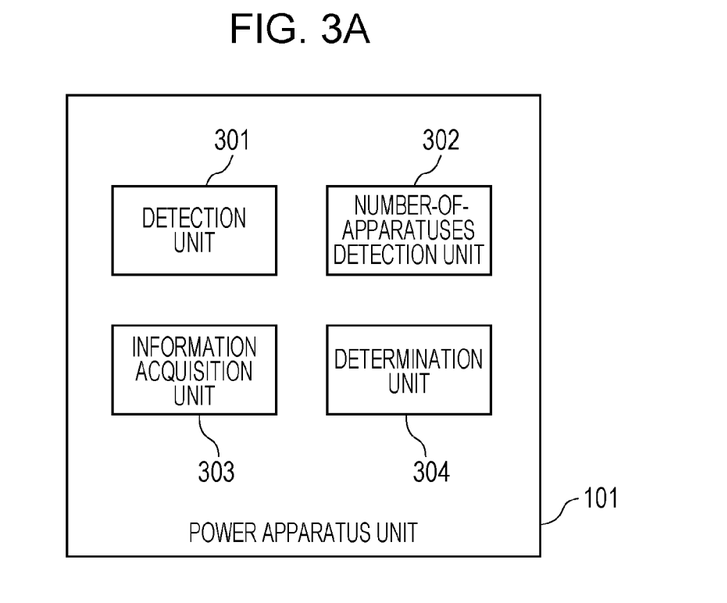
FIG. 3A is a diagram illustrating software function blocks of an electric power supply apparatus.

FIG. 3A illustrates software function blocks realized by the control unit 201 of the electric power supply apparatus 101 by reading out the program stored in the storage unit 202. Part or all of the software function blocks illustrated in FIG. 3A may be realized using hardware.

Figure 7:
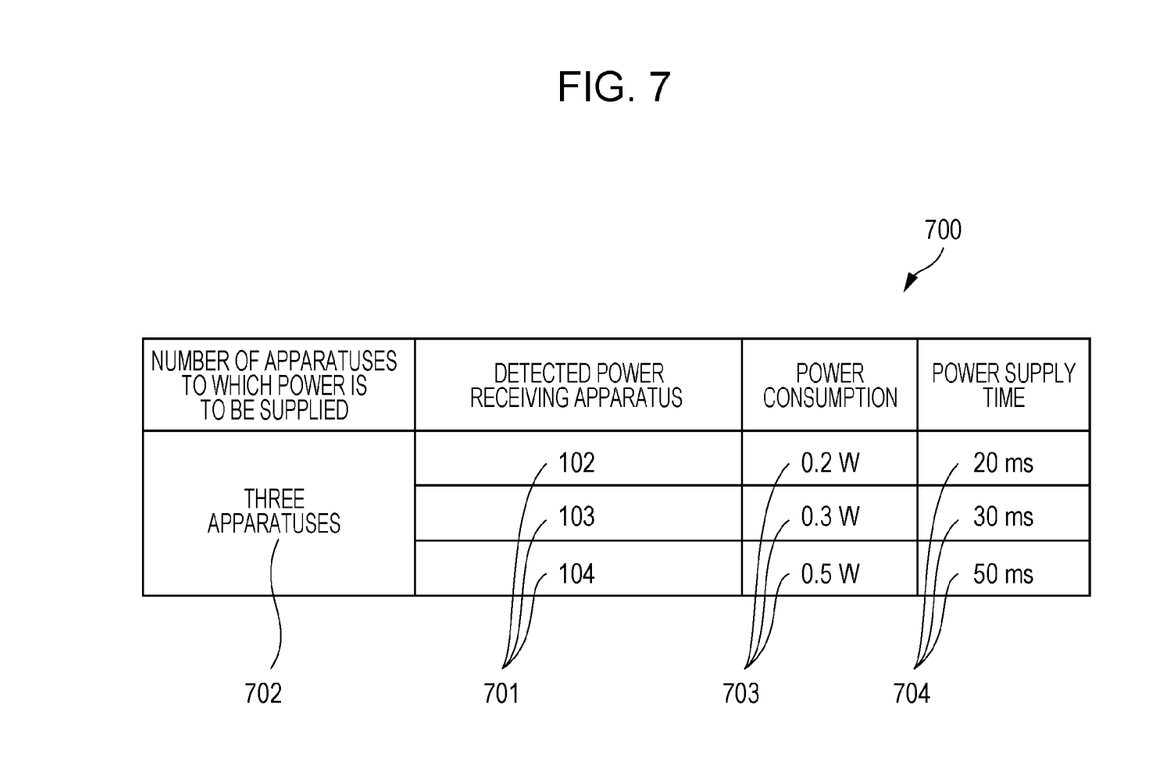
FIG. 7 is a table stored in a storage unit.

A detection unit 301 controls the communication unit 205 to detect one or more electric power receiving apparatuses to which electric power is to be supplied. The information detected by the detection unit 301 as to the electric power receiving apparatuses is stored in the storage unit 202. FIG. 7 illustrates a table 700 stored in the storage unit 202. The information detected by the detection unit 301 as to the electric power receiving apparatuses is described in the table 700 in the storage unit 202 as denoted by 701 in FIG. 7. A number-of-apparatuses detection unit 302 judges the number of electric power receiving apparatuses, detected by the detection unit 301, to which electric power is to be supplied. A judgment result made by the number-of-apparatuses detection unit 302 is described in the table 700 of the storage unit 202 as illustrated by 702 in FIG. 7.

An acquisition unit 303 controls the communication unit 205 to acquire electric power consumption information from each electric power receiving apparatus detected, by the detection unit 301, as apparatuses to which electric power is to be supplied. The electric power consumption information acquired by the acquisition unit 303 is stored in the storage unit 202. The electric power consumption information is described in the table 700 of the storage unit 202 as illustrated by 703 in FIG. 7. Based on the electric power consumption information stored in the storage unit 202, a determination unit 304 determines electric power supplied per unit time to each electric power receiving apparatus, that is, a distribution of electric power among electric power receiving apparatuses. In the present embodiment, by way of example, the distribution of electric power is determined by an electric power supply time. The information as to the electric power supply times determined by the determination unit 304 is described in the table 700 stored in the storage unit 202 as illustrated by 704 in FIG. 7.

Figure 3B:
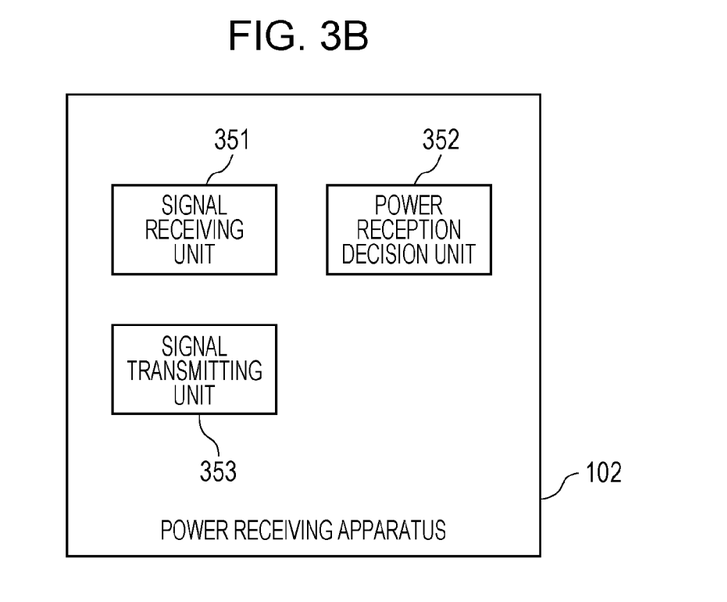
FIG. 3B is a diagram illustrating software function blocks an electric power receiving apparatus.

FIG. 3B illustrates software function blocks realized by the control unit 251 of the electric power receiving apparatus 102 by reading out the program stored in the storage unit 252. Part or all of the software function blocks illustrated in FIG. 3B may be realized using hardware.

The signal receiving unit 351 receives an electric power supply request inquire signal via a communication unit 255. An electric power reception decision unit 352 makes a decision as to whether the electric power receiving apparatus 102 is to receive electric power. A signal transmitting unit 353 transmits a signal (electric power supply request signal) via the communication unit 255 to request for electric power supply.

Figure 4:
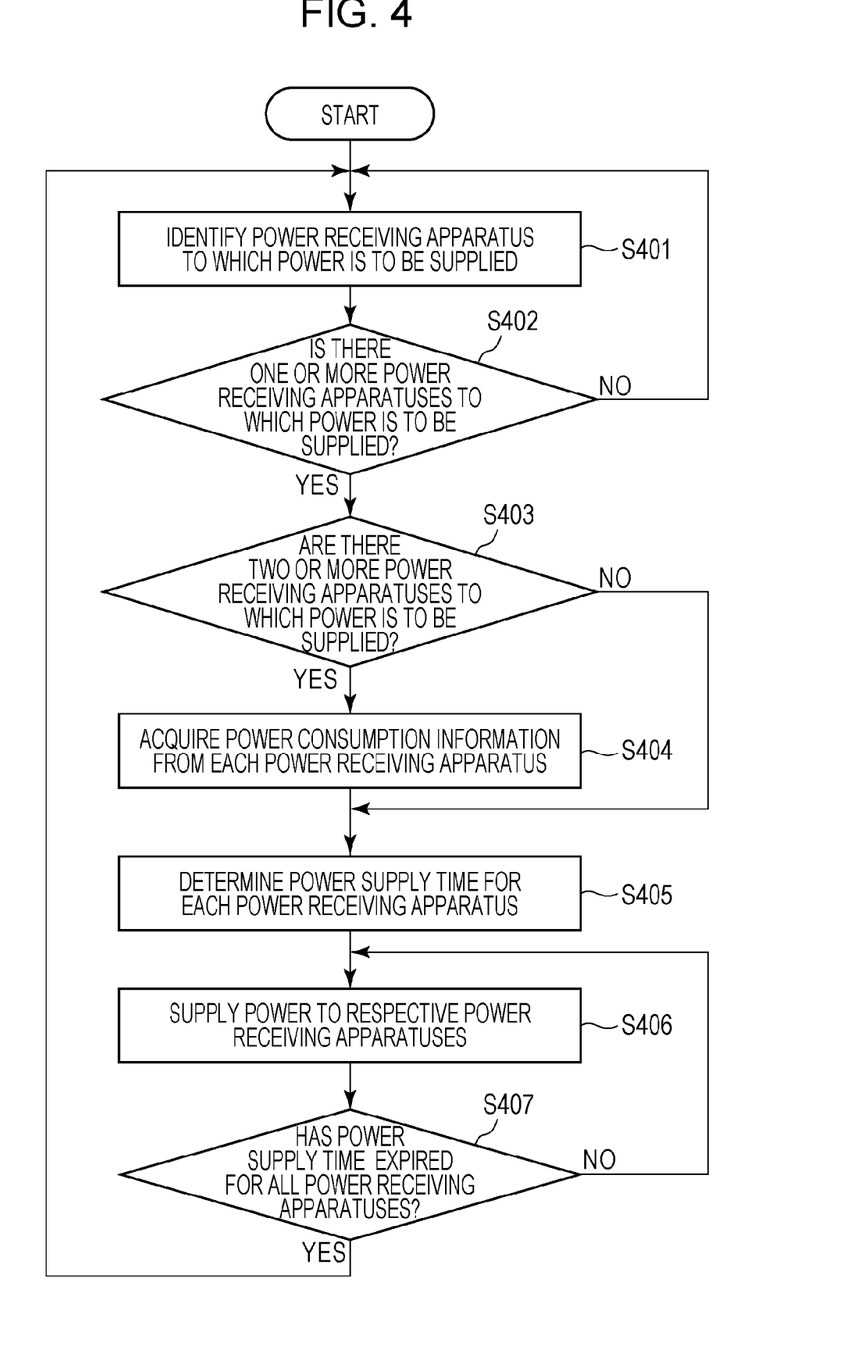
FIG. 4 is a flow chart illustrating a process performed by an electric power supply apparatus.
Figure 5:
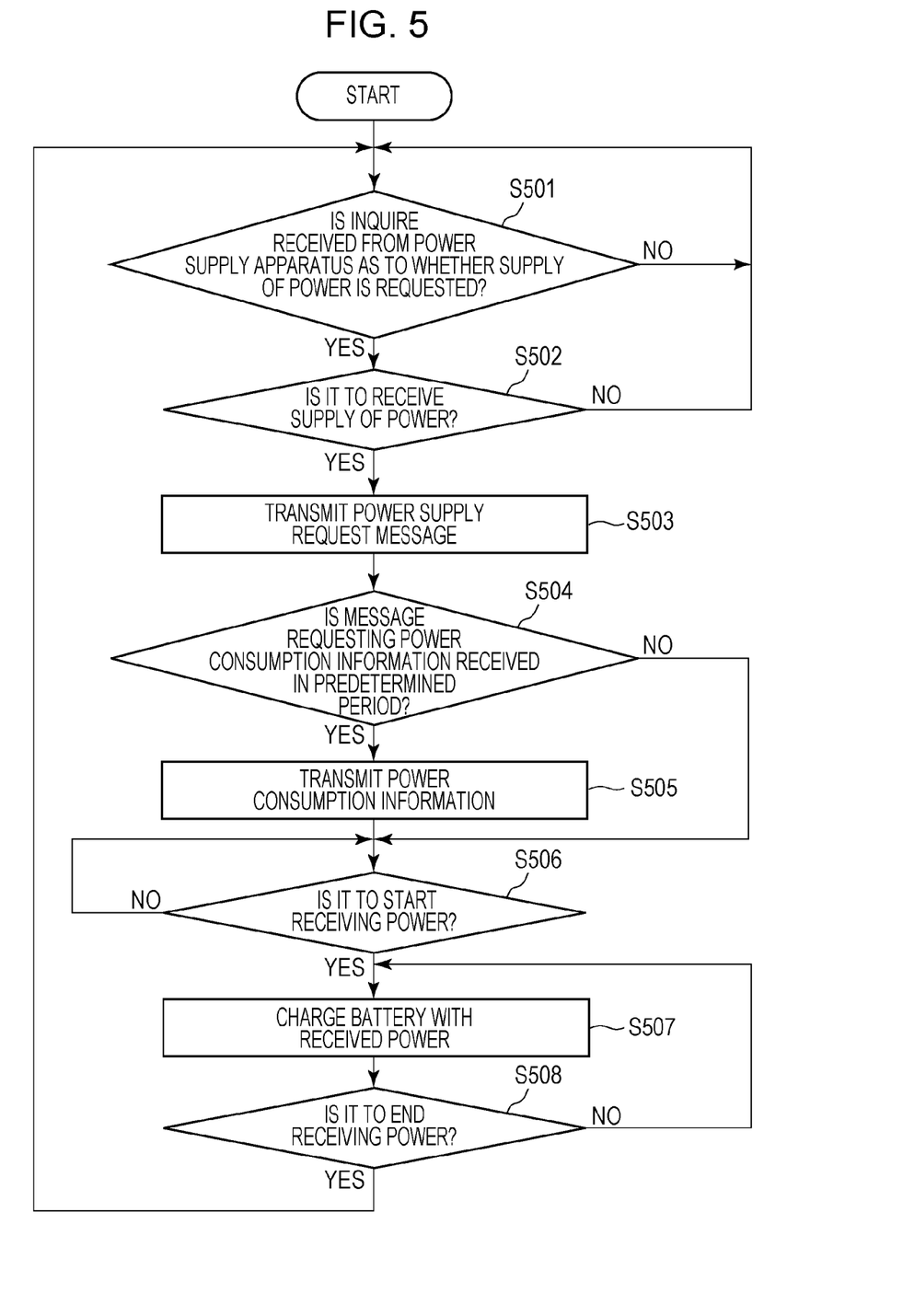
FIG. 5 is a flow chart illustrating a process performed by an electric power receiving apparatus.
Figure 6:
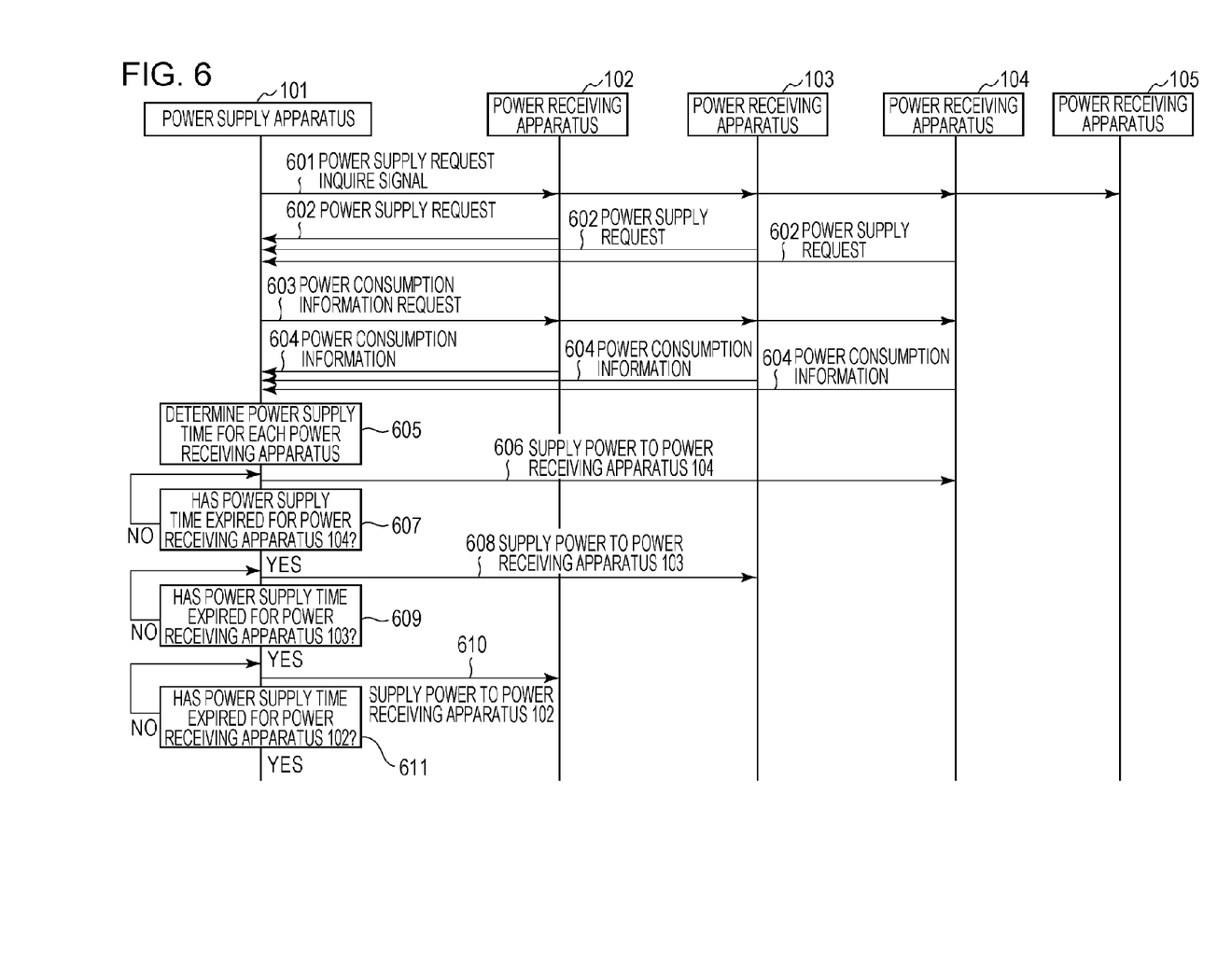
FIG. 6 is a chart illustrating a sequence of operations in which electric power is supplied from an electric power supply apparatus to electric power receiving apparatuses.

FIG. 4 is a flow chart illustrating a process performed by the control unit 201 of the electric power supply apparatus 101 by executing the program read out from the storage unit 202 to supply electric power from the electric power supply apparatus 101 to the electric power receiving apparatus 102 or the like. FIG. 5 is a flow chart illustrating a process performed by the control unit 251 of the electric power receiving apparatus 102 by executing the program read out from the storage unit 252 to receive electric power from the electric power supply apparatus 101 of the electric power receiving apparatus 102. Note that the electric power receiving apparatuses 103 to 105 operate in a similar manner to that electric power receiving apparatus 102. FIG. 6 is a chart illustrating a sequence of operations performed to wirelessly supply electric power from the electric power supply apparatus 101 to the electric power receiving apparatus 102 and other electric power receiving apparatuses.

First, the detection unit 301 of the electric power supply apparatus 101 detects one or more electric power receiving apparatuses to which electric power is to be supplied (S401). More specifically, the detection unit 301 transmits an electric power supply request inquire signal to ask electric power receiving apparatuses whether the electric power receiving apparatuses want to receive electric power (601). If the signal receiving unit 351 of the electric power receiving apparatus 102 receives this electric power supply request inquire signal (the answer to S501 is Yes), the electric power reception decision unit 352 makes a decision whether the electric power receiving apparatus 102 is to receive electric power supply (S502). When the remaining battery charge of the electric source unit 254 is greater than a predetermined value, the electric power reception decision unit 352 decides that the electric power receiving apparatus 102 is not to receive electric power, while the electric power reception decision unit 352 decides that the electric power receiving apparatus 102 is to receive electric power when the remaining battery charge of the electric source unit 254 is lower than the predetermined value. Because electric power is received only when the remaining battery charge is low, it is possible to prevent an unnecessary increase in the number of times the battery is charged, which may result in an increase in battery life. Alternatively, the UI 253 may ask a user to decide whether to receive electric power. If the user issues an instruction to receive electric power, the electric power reception decision unit 352 may decide that the electric power receiving apparatus 102 is to receive electric power. However, when the user issues an instruction not to receive electric power, the electric power reception decision unit 352 may decide that the electric power receiving apparatus 102 is not to receive electric power. This makes it possible to make a decision according to an instruction issued by a user as to whether to receive electric power.

In a case where the decision made by the electric power reception decision unit 352 is that the electric power receiving apparatus 102 is to receive electric power (the answer to S502 is Yes), the signal transmitting unit 353 transmits a signal (electric power supply request signal) to request for electric power supply (S503, 602). On the other hand, in a case where the decision made by the electric power reception decision unit 352 is that the electric power receiving apparatus 102 is not to receive electric power, the signal transmitting unit 353 does not transmit the electric power supply request signal. Alternatively, the signal transmitting unit 353 may transmit a signal indicating that supplying of electric power is not requested. The detection unit 301 of the electric power supply apparatus 101 detects the electric power supply request signal thereby detecting an electric power receiving apparatus to which electric power is to be supplied (S401). In the present example, it is assumed by way of example that electric power receiving apparatuses 102 to 104 are detected as electric power receiving apparatuses to which electric power is to be supplied. It is assumed that the electric power receiving apparatus 105 has a greater remaining battery charge than the predetermined value, and thus the electric power receiving apparatus 105 is not an electric power receiving apparatus to which electric power is to be supplied. The detection unit 301 stores the information associated with the detected electric power receiving apparatuses in the storage unit 202 (refer to 701 in FIG. 7). In this specific example, the number-of-apparatuses detection unit 302 detects that three electric power receiving apparatuses are detected as electric power receiving apparatuses to which electric power is to be supplied, and the number-of-apparatuses detection unit 302 stores the information on the decision result in the storage unit 202 (refer to 702 in FIG. 7).

Furthermore, the number-of-apparatuses detection unit 302 refers to the table 700 stored in the storage unit 202 to determine whether the detection unit 301 has detected one or more electric power receiving apparatuses to which electric power is to be supplied (S402). There is a possibility that no electric power receiving apparatus is detected to which electric power is to be supplied, for example, in a case where no electric power supply request signal is returned in a predetermined period of time after an electric power supply request inquire signal is transmitted. In a case where one or more electric power receiving apparatuses have been detected, the processing flow proceeds to S403, but otherwise the processing flow returns to S401.

In a case where there is detected an electric power receiving apparatus to which electric power is to be supplied (the answer to S402 is Yes), the number-of-apparatuses detection unit 302 refers to the table 700 stored in the storage unit 202 to determine whether there are two or more electric power receiving apparatuses detected as electric power receiving apparatuses to which electric power is to be supplied (S403). In a case where two or more electric power receiving apparatuses are detected as electric power receiving apparatuses to which electric power is to be supplied (the answer to S403 is Yes), the acquisition unit 303 acquires electric power consumption information from each electric power receiving apparatus detected (S404). More specifically, the acquisition unit 303 transmits a signal (electric power information request signal) to request each detected electric power receiving apparatus to return electric power consumption information (603).

If the electric power information request signal is received by the signal receiving unit 351 of the electric power receiving apparatus 102 (the answer to S504 is Yes), then, in response to receiving this signal, the signal transmitting unit 353 transmits information (electric power consumption information) associated with electric power consumption of the electric power receiving apparatus 102 (S505, 604). The electric power consumption information indicates electric energy (electric power consumption) consumed per unit time by the electric power receiving apparatus 102. The signal transmitting unit 353 transmits the electric power consumption information when the signal receiving unit 351 receives the electric power information request signal within a predetermined period of time after the signal transmitting unit 353 transmits the electric power supply request signal. Thus the acquisition unit 303 of the electric power supply apparatus 101 receives current electric power consumption information from the electric power receiving apparatus 102. Similarly, the acquisition unit 303 acquires current electric power consumption information from the respective electric power receiving apparatuses 103 and 104. The acquisition unit 303 stores the electric power consumption information, acquired in the above-described manner, in the storage unit 202 (refer to 703 in FIG. 7). In the present example, it is assumed that the electric power consumption of the electric power receiving apparatus 102 is 0.2 W, the electric power consumption of the electric power receiving apparatus 103 is 0.3 W, and the electric power consumption of the electric power receiving apparatus 104 is 0.5 W.

Next, the determination unit 304 refers to the table 700 stored in the storage unit 202 and determines electric power supplied per unit time to each electric power receiving apparatus of the electric power receiving apparatuses 102 to 104, that is, an electric power distribution among these electric power receiving apparatuses based on the electric power consumption information associated with the respective electric power receiving apparatuses 102 to 104 (S405, 605). More specifically, in the present example, an electric power supply time for each electric power receiving apparatus is determined based on the ratio of the electric power consumption of the electric power receiving apparatus. In the present example, as described above, it is assumed that the electric power consumption of the electric power receiving apparatus 102 is 0.2 W, the electric power consumption of the electric power receiving apparatus 103 is 0.3 W, and the electric power consumption of the electric power receiving apparatus 104 is 0.5 W. Thus, in a case where electric power is supplied in a time sharing manner in each unit period of 100 ms, the electric power supply time for each electric power receiving apparatus may be determined as follows. That is, a time of 20 ms is assigned to the electric power receiving apparatus 102, a time of 30 ms is assigned to electric power receiving apparatus 103, and a time of 50 ms is assigned to the electric power receiving apparatus 104. As described above, based on the electric power consumption information, the electric energy supplied to each electric power receiving apparatus per unit time is determined. Note that in a case where only one electric power receiving apparatus is detected in step S403, a time of 100 ms is assigned to this electric power receiving apparatus. Information about the electric power supply times determined in the above described manner is stored in the storage unit 202 by the determination unit 304 (refer to 704 of FIG. 7).

Thereafter, under the control of the control unit 201, the electric power supply unit 206 refers to the table 700 stored in the storage unit 202 and supplies electric power to the electric power receiving apparatuses 102 to 104 sequentially in the time sharing manner according to the electric power supply times determined by the determination unit 304 (S406, S407, 606 to 611). To measure the electric power supply time, a timer is used although it is not illustrated in the figures. The electric power is supplied sequentially to the electric power receiving apparatuses in descending order of electric power consumption. When the electric power supply time assigned to the detected electric power receiving apparatuses 102 to 104 has elapsed, the processing flow returns to S401. More specifically, supplying of electric power to the electric power receiving apparatus 104 is started and, at the same time, the timer is started to measure the elapse of time. When the timer value reaches 50 ms, supplying of electric power to the electric power receiving apparatus 104 is stopped. Then supplying of electric power to the electric power receiving apparatus 103 is started and, at the same time, the timer is restarted to measure the elapse of time. When the timer value recounted since the restart reaches 30 ms, supplying of electric power to the electric power receiving apparatus 103 is stopped. Finally, supplying of electric power to the electric power receiving apparatus 102 is started and, at the same time, the timer is restarted to measure the elapse of time. When the timer value recounted since the restart reaches 20 ms, supplying of electric power to the electric power receiving apparatus 102 is stopped.

On the other hand, in the electric power receiving apparatus 102, the electric power receiving unit 256 receives electric power (the answer to S506 is Yes), and the electric source unit 254 (battery) is charged by the received electric power (S507). When the electric power supply time assigned to the electric power receiving apparatus 102 expires (the answer to S508 is Yes), the processing flow returns to S501.

Figure 9:
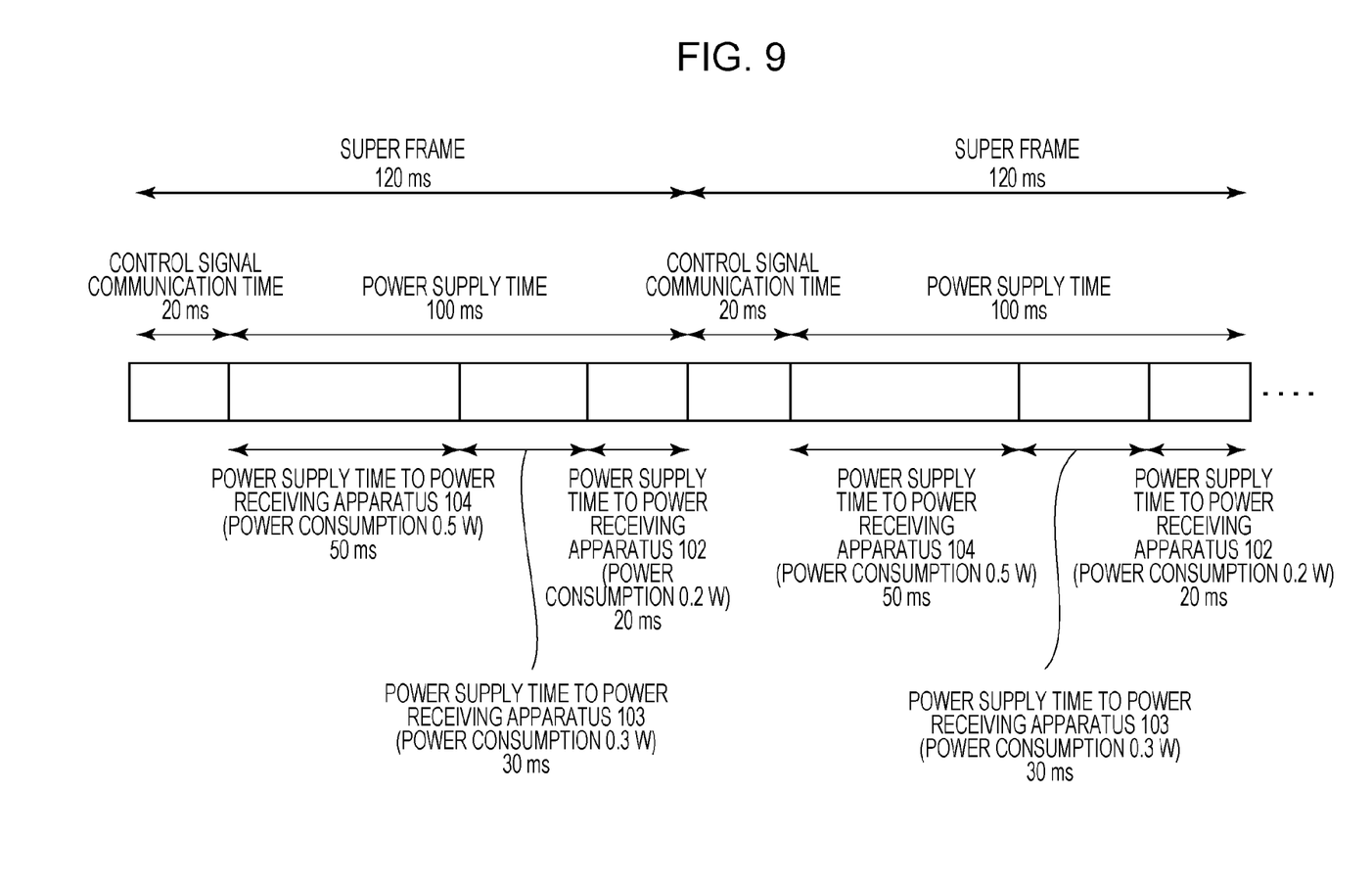
FIG. 9 is a chart illustrating electric power supply times.

Through the operation described above, the supplying of electric power is performed repeatedly at regular intervals (in units of superframes of 120 ms) as illustrated in FIG. 9. In the preset example, it is assumed that a time of 20 ms is spent to transmit signals and process the signals (signal communication process) in 601 to 604 in FIG. 6. After that, the electric power supply time with the length of 100 ms follows. The electric power supply time includes 50 ms for the electric power receiving apparatus 104, 30 ms for the electric power receiving apparatus 103, and 20 ms for the electric power receiving apparatus 102. In a next period of 120 ms, the signal communication process and the electric power supply are performed in a similar manner. In a case where a change occurs in terms of electric power consumption of some electric power receiving apparatus, the electric power supply time assigned to the electric power receiving apparatuses are changed depending on new electric power consumption.

As described above, electric power is supplied to each electric power receiving apparatus such that electric energy supplied to each electric power receiving apparatus is controlled depending on the electric power consumption of electric power receiving apparatus. In the process according to the present embodiment, when the electric power supply time assigned to the detected electric power receiving apparatuses expires, the processing flow returns to S401. Thus, it is possible to, periodically at particular intervals of time, determine electric power consumption of each of a plurality of electric power receiving apparatuses, and determine the electric energy supplied to each electric power receiving apparatus depending on the electric power consumption of the electric power receiving apparatus. That is, it is possible to supply electric power adaptively depending on a change in electric power consumption with time. For example, when a change occurs in electric energy supplied to the electric power receiving apparatus 102, the electric power supply apparatus 101 notifies the electric power receiving apparatus 102 of the change. This makes it possible for the electric power receiving apparatus 102 to recognize that the amount of receiving electric power is going to change, before the change actually occurs.

In the embodiment described above, the information stored in the table 700 of the storage unit 202 is deleted when the electric power supply time expires (when the answer to S407 in FIG. 4 is Yes) so that it becomes possible to use the same memory area to write another information in the table 700. This makes it possible to reduce a memory capacity needed. Alternatively, when no response to an electric power supply request inquire signal is returned, information associated with the electric power receiving apparatus may be deleted from the table 700. This makes it possible to control the electric power supply using electric power consumption information received in a previous operation even when it is failed, for example, to receive electric power consumption information.

Figure 8A:
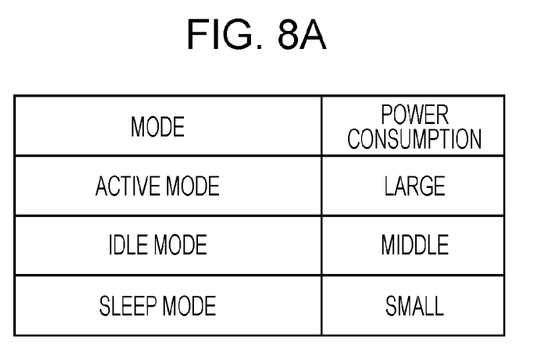
FIG. 8A is a diagram illustrating a relationship between electric power consumption and a mode.

In the embodiment described above, electric power consumption information indicates electric power consumed per unit time (electric power consumption) by the electric power receiving apparatus. Alternatively, electric power consumption information may indicate a mode (or a state) of the electric power receiving apparatus. For example, when the electric power receiving apparatus has three modes including an active mode, an idle mode, and a sleep mode, information indicating which of these three modes the electric power receiving apparatuses in may be sent as electric power consumption information. The active mode is a mode in which the electric power receiving apparatus performs an operation such as communication with another communication apparatus (not illustrated), outputting (printing or displaying) data, or the like, and electric power consumption in this mode is the highest of all three modes. The idle mode is a mode in which the electric power receiving apparatus waits for data to arrive from another communication apparatus before the electric power receiving apparatus outputs the received data, and the electric power consumed in this mode is next highest to the active mode. If the idle mode continues for a predetermined period, the mode is switched to the sleep mode in which supplying of electric power to part of hardware units in the electric power receiving apparatus is stopped or reduced to reduce the electric power consumption of the electric power receiving apparatus. In the sleep mode, electric power consumption is lowest of the three modes. FIG. 8A illustrates an example of a table representing a relationship between the modes and electric power consumption. In the present embodiment, it is assumed that the table illustrated in FIG. 8A is stored in advance in the storage unit 202.

The electric power supply apparatus 101 assigns electric power supply times to electric power receiving apparatuses such that a longer electric power supply time is assigned to an electric power receiving apparatus in the idle mode than to an electric power receiving apparatus in the sleep mode. Furthermore, the electric power supply apparatus 101 assigns electric power supply times to electric power receiving apparatuses such that a longer electric power supply time is assigned to an electric power receiving apparatus in the active mode than to an electric power receiving apparatus in the idle mode. For example, the ratio of the electric power supply times assigned to the electric power receiving apparatuses may be set to 1:2:3 among an electric power receiving apparatus in the sleep mode, an electric power receiving apparatus in the idle mode, and an electric power receiving apparatus in the active mode.

Also in this manner, electric power supplied to a plurality of electric power receiving apparatuses may be controlled depending on electric power consumption of the respective electric power receiving apparatuses. Each electric power receiving apparatus may notify, periodically at scheduled intervals, the electric power supply apparatus of the mode of the electric power receiving apparatus. In a case where a change in mode occurs, the electric power supply apparatus notifies the electric power receiving apparatus of a change in electric power supply time. This makes it possible to supply electric power adaptively depending on a change in the mode of the electric power receiving apparatus, and also makes it possible for the electric power receiving apparatus to recognize that the amount of receiving electric power is going to change, before the change actually occurs.

Figure 8B:
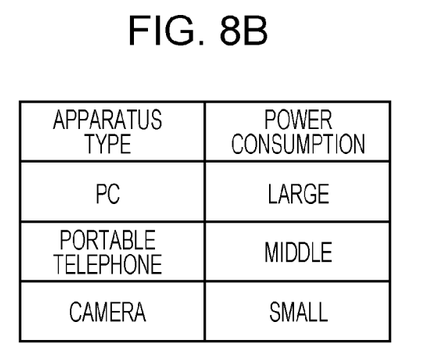
FIG. 8B is a diagram illustrating a relationship between electric power consumption and an apparatus type.

The electric power consumption information may be information (apparatus information) indicating an apparatus type of the electric power receiving apparatus. FIG. 8B illustrates an example of a table representing a relationship between the apparatus types and electric power consumption. In the present embodiment, it is assumed that the table illustrated in FIG. 8B is stored in advance in the storage unit 202. The electric power supply apparatus 101 acquires apparatus information as electric power consumption information from each electric power receiving apparatus. The electric power supply apparatus 101 determines the electric power supply time for each electric power receiving apparatus depending on the apparatus type of the electric power receiving apparatus. For example, the ratio of the electric power supply times assigned to the electric power receiving apparatuses may be set to 3:2:1 among a personal computer (PC), a portable telephone (for example, smartphone or the like), and a camera. That is, the electric power supply apparatus 101 acquires apparatus type information from each electric power receiving apparatus and determines electric power consumption of each electric power receiving apparatus based on the acquired apparatus type. The electric power supply apparatus 101 then supplies electric power to the electric power receiving apparatuses depending on the electric power consumption.

In the embodiments described above, the electric power supply apparatus acquires the electric power consumption information from the electric power receiving apparatuses. Alternatively, the electric power supply apparatus may periodically receive information indicating remaining battery charge instead of electric power consumption information from an electric power receiving apparatus, and the electric power supply apparatus may calculate a difference in remaining battery charge between adjacent periods thereby determining electric power consumption of the electric power receiving apparatus. Thus, even in a case where one or more electric power receiving apparatuses notify the electric power supply apparatus of the remaining battery charge but not of the electric power consumption information, the electric power supply apparatus is capable of controlling the electric power supplied to the respective electric power receiving apparatuses depending on the electric power consumption thereof.

In the embodiments described above, each of the plurality of electric power receiving apparatuses notifies the electric power supply apparatus of electric power consumption information or alternative information. However, there is a possibility that an electric power receiving apparatus does not provide electric power consumption information or alternative information. In a case where electric power consumption information or alternative information is not acquired from an electric power receiving apparatus, the electric power supply apparatus may assign a predetermined electric power supply time to this electric power receiving apparatus. When electric power consumption information is received from a plurality of electric power receiving apparatuses, the average value of notified electric power consumption (in a case where electric power consumption information is received from only one electric power receiving apparatus, the electric power consumption of this electric power receiving apparatus) may be employed as the electric power consumption for a particular electric power receiving apparatus.

This makes it possible to handle a case where there is an electric power receiving apparatus that does not have the capability of providing electric power consumption information. That is, even in this case, it is possible to supply electric power to this particular electric power receiving apparatus and it is possible to control the electric power supplied to the other electric power receiving apparatuses depending on the electric power consumption of the respective electric power receiving apparatuses.

In the embodiments described above, in the case where the detection unit 301 detects a plurality of electric power receiving apparatuses, the acquisition unit 303 transmits an electric power information request signal, while in the case where the detection unit 301 detects only one electric power receiving apparatus, the acquisition unit 303 does not transmit an electric power information request signal. This allows a reduction in a processing load in communication between the electric power supply apparatus and electric power receiving apparatuses.

Alternatively, regardless of whether the detection unit 301 detects a plurality of electric power receiving apparatuses or only one electric power receiving apparatus, the acquisition unit 303 may transmit an electric power information request signal. In this case, the decision process in step S403 illustrated in FIG. 4 may be omitted, which allows a reduction in a processing load imposed on the electric power supply apparatus.

Even when only one electric power receiving apparatus is detected, it is possible to detect an electric power consumption value of this electric power receiving apparatus, and thus it is possible to control the electric power supply time for this electric power receiving apparatus. For example, when the electric power consumption value of the electric power receiving apparatus is greater than a predetermined value, the electric power supply time may be set to 100 ms, while the electric power supply time may be set to 50 ms when the electric power consumption value is lower than the predetermined value. As described above, even in the case where electric power is supplied to only one electric power receiving apparatus, it is possible to control the electric energy depending on the electric power consumption of the electric power receiving apparatus.

In alternative embodiment, supplying of electric power may be controlled as follows.

The detection unit 301 receive remaining battery charge information from each of all detected electric power receiving apparatuses. When the remaining battery charge is greater than a predetermined value in all electric power receiving apparatuses, electric power is supplied to the electric power receiving apparatuses while controlling the electric energy supplied thereto depending on the electric power consumption of each electric power receiving apparatus in the manner described in the previous embodiments (first mode). On the other hand, in a case where there is an electric power receiving apparatus having a remaining battery charge lower than the predetermined value, high priority is put on this electric power receiving apparatus in supplying electric power to the electric power receiving apparatuses (second mode). That is, the lower the remaining battery charge of an electric power receiving apparatus, the greater electric power is supplied. This makes it possible to avoid a situation in which an electric power receiving apparatus having a low remaining battery charge is allowed to receive only low electric power supply when the electric power receiving apparatus is low in electric power consumption.

In the embodiments described above, the electric power supply apparatus determines the electric power supply time individually for each of a plurality of electric power receiving apparatuses. Alternatively, in the case where the electric power supply apparatus wirelessly supplies electric power using the magnetic resonance method, the electric power supply apparatus may instruct each electric power receiving apparatus to change the resonance frequency of the electric power receiving unit in the electric power receiving apparatus. That is, the amount of electric power supplied to each electric power receiving apparatus is controlled depending on the resonance frequency of the electric power receiving apparatus and the frequency used by the electric power supply apparatus in supplying electric power such that optimum electric energy is supplied to each of a plurality of electric power receiving apparatuses depending on the electric power consumption of the electric power receiving apparatus.

In alternative embodiment, an electric power receiving apparatus may transmit, as an electric power supply request signal, a signal strength notification indicating an signal strength of an electric power supply request inquire signal received from the electric power supply apparatus. When the electric power supply apparatus detects a signal strength notification from a particular electric power receiving apparatus, the electric power supply apparatus determines that the electric power receiving apparatus is requesting the electric power supply apparatus to supply electric power. Depending on the signal strength indicated by the signal strength notification, the electric power supply apparatus may move a primary coil or select a coil used in supplying electric power. This makes it possible to reduce a processing load imposed on the electric power supply apparatus and electric power receiving apparatuses compared with the case where each electric power receiving apparatus transmits both an electric power supply request signal and a signal strength notification separately, and the electric power supply apparatus receives these two signals.

In a still alternative embodiment, the electric power supply request inquire signal (601 in FIG. 6) and the electric power information request signal (603 in FIG. 6) transmitted by the electric power supply apparatus may be the same signal. That is, when the electric power supply apparatus detects the existence of an electric power receiving apparatus by any method, the electric power supply apparatus transmits an electric power supply request inquire signal. When this electric power supply request inquire signal is detected by the electric power receiving apparatus, the electric power receiving apparatus transmits an electric power supply request signal. If this electric power supply request signal is detected by the electric power supply apparatus, the electric power supply apparatus continues transmitting a signal similar to the electric power supply request inquire signal. If this signal similar to the electric power supply request inquire signal is detected by the electric power receiving apparatus after the transmission of the electric power supply request signal, the electric power receiving apparatus transmits electric power consumption information. This makes it possible to reduce a processing load imposed on the electric power supply apparatus and electric power receiving apparatuses compared with the case where the electric power supply apparatus transmits the electric power supply request inquire signal and the electric power information request signal as different signals, and electric power receiving apparatuses receive these two different signals.

According to one of the embodiments described above, it is possible to distribute electric power to a plurality of electric power receiving apparatuses adaptively depending on electric power consumption of each electric power receiving apparatus. The embodiments provide one or more advantageous effects described above.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a national phase application of international application PCT/JP2013/004005, filed on Jun. 26, 2013, which is hereby incorporated by reference herein in its entirety, and this application claims the benefit of Japanese Patent Application No. 2012-152390, filed Jul. 6, 2012, which is hereby incorporated by reference herein in its entirety.

The invention claimed is:

1. An electric power supply apparatus comprising:
a detection unit configured to detect one or more electric power receiving apparatuses;
an acquisition unit configured to acquire state information associated with a state of each of a plurality of electric power receiving apparatuses in a case where the detection unit detects the plurality of power receiving apparatuses, and the acquisition unit configured not to acquire state information of one electric power receiving apparatus in a case where the detection unit detects the one electric power receiving apparatus, wherein the state includes a first state and a second state lower than the first state in power consumption;
a determination unit configured to:
determine, in a case where the detection unit detects a plurality of electric power receiving apparatuses, an amount of electric power to be supplied to the plurality of electric power receiving apparatuses based on the state information acquired by the acquisition unit such that a greater amount of electric power is supplied to a first electric power receiving apparatus among the plurality of electric power receiving apparatuses in a case where state information for the first electric power receiving apparatus indicates the first state and state information for other electric power receiving apparatuses among the plurality of electric power receiving apparatuses indicates the second state in comparison with a case where state information for all of the plurality of electric power receiving apparatuses indicates the second state, and
determine, in a case where the detection unit detects one electric power receiving apparatus, an amount of electric power to be supplied to the one electric power receiving apparatus not based on state information of the one electric power receiving apparatus; and
an electric power supply unit configured to supply electric power to each of one or more electric power receiving apparatuses according to a determination by the determination unit.

2. The electric power supply apparatus according to claim 1, wherein the determination unit determines a length of electric power supply time for each of the plurality of electric power receiving apparatuses based on the state information acquired by the acquisition unit.

3. The electric power supply apparatus according to claim 2, wherein in a case where the electric power supply unit supplies electric power to the first electric power receiving apparatus and a second electric power receiving apparatus and the state information for the second electric power receiving apparatus indicates the first state and the state information for the first electric power receiving apparatus is the second state, the determination unit determines the amount of electric power to be supplied to the plurality of electric power receiving apparatuses such that the length of the electric power supply time for the second electric power receiving apparatus is greater than the length of the electric power supply time for the first electric power receiving apparatus.

4. The electric power supply apparatus according to claim 1, further comprising a notification unit configured to notify, when a change of electric power amount to be supplied to the electric power receiving apparatus is to occur, at least one of the plurality of electric power receiving apparatuses of the change.

5. The electric power supply apparatus according to claim 1, wherein in a case where the acquisition unit does not acquire the state information of a particular electric power receiving apparatus among the plurality of electric power receiving apparatuses, the determination unit determines an amount of electric power to be supplied to the particular electric power receiving apparatus according to a predetermined distribution of electric power.

6. The electric power supply apparatus according to claim 1, wherein in a case where the acquisition unit does not acquire the state information of a particular electric power receiving apparatus among the plurality of electric power receiving apparatuses, the determination unit determines a distribution of electric power to the particular electric power receiving apparatus by assuming that electric power consumption of the particular electric power receiving apparatus is equal to an average of electric power consumption of remaining electric power receiving apparatuses.

7. The electric power supply apparatus according to claim 1, further comprising a receiving unit configured to receive battery information indicating a remaining battery charge of each of the plurality of electric power receiving apparatuses.

8. The electric power supply apparatus according to claim 7, wherein the determination unit determines an amount of the electric power to be supplied to each of the plurality of electric power receiving apparatuses according to the battery information received by the receiving unit in addition to the state information acquired by the acquisition unit, and the electric power supply unit supplies electric power according to the determination by the determination unit.

9. An electric power supply apparatus comprising:
a detection unit configured to detect one or more electric power receiving apparatuses;

an acquisition unit configured to acquire electric power consumption of each of a plurality of electric power receiving apparatuses in a case where the detection unit detects the plurality of power receiving apparatuses, and the acquisition unit configured not to acquire state information of one electric power receiving apparatus in a case where the detection unit detects the one electric power receiving apparatus;

a determination unit configured to:
 determine, in a case where the detection unit detects a plurality of electric power receiving apparatuses, a length of an electric power supply time for each of the plurality of electric power receiving apparatuses according to the electric power consumption information of each of the plurality of electric power receiving apparatuses, and
 determine, in a case where the detection unit detects one electric power receiving apparatus, a length of an electric power supply time for the one electric power receiving apparatus not based on state information of the one electric power receiving apparatus; and an electric power supply unit configured to supply electric power to each of one or more electric power receiving apparatuses based on the length of the electric power supply time determined by the determination unit.

10. A method of controlling an electric power supply apparatus, comprising:
 detecting one or more electric power receiving apparatuses;
 acquiring state information associated with a state of each of a plurality of electric power receiving apparatuses in a case where the detecting detects the plurality of power receiving apparatuses, and not acquiring state information of one electric power receiving apparatus in a case where the detecting detects the one electric power receiving apparatus, wherein the state includes a first state and a second state lower than the first state in power consumption;
 determining, in a case where the detecting detects a plurality of electric power receiving apparatuses, an amount of electric power to be supplied to the plurality of electric power receiving apparatuses based on the acquired state information such that a greater amount of electric power is supplied to a first electric power receiving apparatus among the plurality of electric power receiving apparatuses in a case where state information for the first electric power receiving apparatus indicates the first state and state information for other electric power receiving apparatuses among the plurality of electric power receiving apparatuses indicates the second state in comparison with a case where state information for all of the plurality of electric power receiving apparatuses indicates the second state;
 determining, in a case where the detecting detects one electric power receiving apparatus, an amount of electric power to be supplied to the one electric power receiving apparatus not based on state information of the one electric power receiving apparatus; and
 supplying electric power to each of one or more electric power receiving apparatuses according to a determination by the determining.

11. A method of controlling an electric power supply apparatus, comprising:
 detecting one or more electric power receiving apparatuses;
 acquiring electric power consumption of each of a plurality of electric power receiving apparatuses in a case where the detecting detects the plurality of power receiving apparatuses, and not acquiring state information of one electric power receiving apparatus in a case where the detecting detects the one electric power receiving apparatus;
 determining, in a case where the detecting detects a plurality of electric power receiving apparatuses, a length of an electric power supply time for each of the plurality of electric power receiving apparatuses according to the electric power consumption information of each of the plurality of electric power receiving apparatuses;
 determining, in a case where the detecting detects one electric power receiving apparatus, a length of an electric power supply time for the one electric power receiving apparatus not based on state information of the one electric power receiving apparatus; and
 supplying electric power to each of one or more electric power receiving apparatuses based on the determined length of the electric power supply time.

12. A non-transitory computer-readable storage medium which stores a program configured to cause a computer to operate as the electric power supply apparatus according to claim 1.

13. A non-transitory computer-readable storage medium which stores a program configured to cause a computer to operate as the electric power supply apparatus according to claim 9.

14. The electric power supply apparatus according to claim 1, further comprising a detection unit configured to detect a change of the state of at least one of the plurality of electric power receiving apparatuses based on the state information that is acquired by the acquisition unit according to a predetermined interval, and wherein the determination unit determines, according to the detection, an electric power to be supplied to the plurality of electric power receiving apparatuses.

15. The electric power supply apparatus according to claim 1, wherein the acquisition unit does not request the state information from an electric power receiving apparatus if the detection unit detects only one electric power receiving apparatus and the acquisition unit requests the state information from each of the plurality of electric power receiving apparatuses if the detection unit detects more than one electric power receiving apparatus.

\* \* \* \* \*